(12) United States Patent
Rom

(10) Patent No.: US 9,520,039 B2
(45) Date of Patent: Dec. 13, 2016

(54) METHOD FOR SECURING AN ELECTRONIC DEVICE HAVING A SIGNAL OUTPUT AGAINST REMOVAL FROM A CARRYING DEVICE, AND CARRYING DEVICE

(71) Applicant: ROM AG, Eupen (BE)

(72) Inventor: Paul Rom, Eupen (BE)

(73) Assignee: ROM AG, Eupen (BE)

( * ) Notice: Subject to any disclaimer, the term of this patent is extended or adjusted under 35 U.S.C. 154(b) by 0 days.

(21) Appl. No.: 14/422,360

(22) PCT Filed: Aug. 20, 2013

(86) PCT No.: PCT/EP2013/067305
§ 371 (c)(1),
(2) Date: Feb. 19, 2015

(87) PCT Pub. No.: WO2014/029768
PCT Pub. Date: Feb. 27, 2014

(65) Prior Publication Data
US 2015/0228169 A1 Aug. 13, 2015

(30) Foreign Application Priority Data
Aug. 21, 2012 (DE) .................. 10 2012 107 653

(51) Int. Cl.
*G08B 13/14* (2006.01)
*G06F 1/16* (2006.01)
(Continued)

(52) U.S. Cl.
CPC ............ *G08B 13/14* (2013.01); *E05B 73/0082* (2013.01); *F16M 11/22* (2013.01); *F16M 13/00* (2013.01);
(Continued)

(58) Field of Classification Search
CPC .. G08B 13/1418; G08B 13/14; G08B 13/1409
See application file for complete search history.

(56) References Cited

U.S. PATENT DOCUMENTS 4,669,029 A * 5/1987 Svenson .............. H05K 5/0204
177/143
5,892,651 A * 4/1999 Arai ..................... G11B 17/056
361/212

(Continued)

FOREIGN PATENT DOCUMENTS

DE  26 36 512 A1  3/1977
DE  94 00 568 U1  3/1994
(Continued)

*Primary Examiner* — Hongmin Fan
(74) *Attorney, Agent, or Firm* — Norman B. Thot

(57) ABSTRACT

A method for securing an electronic device comprising a signal output and an input apparatus against removal from a carrying device. The method includes inputting a code with the input apparatus, generating, with the code inputted with the input apparatus, via a data processing program, a signal at the signal output of the electronic device, providing a locking apparatus configured to secure the electronic device, comparing, with the locking apparatus, the signal with a predetermined target signal, and putting the locking apparatus into an unlocked state if a match exists between the signal and the predetermined target signal.

12 Claims, 6 Drawing Sheets

(51) Int. Cl.
*G06F 21/31* (2013.01)
*G06F 21/88* (2013.01)
*F16M 11/22* (2006.01)
*F16M 13/00* (2006.01)
*F16M 13/02* (2006.01)
*E05B 73/00* (2006.01)

(52) U.S. Cl.
CPC ............ F16M 13/02 (2013.01); G06F 1/1632 (2013.01); G06F 21/31 (2013.01); G06F 21/88 (2013.01); *G08B 13/1409* (2013.01); *G08B 13/1418* (2013.01)

(56) References Cited

U.S. PATENT DOCUMENTS

| | | | |
|---|---|---|---|
| 6,607,275 B1* | 8/2003 | Cimini | G09F 19/18 353/28 |
| 7,782,205 B1 | 8/2010 | Gakumura et al. | |
| 2005/0110294 A1* | 5/2005 | Grafton | B60R 9/00 296/37.1 |
| 2006/0107073 A1 | 5/2006 | Lane et al. | |
| 2007/0045410 A1* | 3/2007 | Rudduck | A47F 7/024 235/381 |
| 2008/0072336 A1 | 3/2008 | Tung et al. | |
| 2010/0176919 A1* | 7/2010 | Myers | G07C 9/00571 340/5.73 |
| 2011/0153121 A1* | 6/2011 | Minassian | B60R 25/24 701/2 |
| 2012/0182146 A1 | 7/2012 | Berglund et al. | |

FOREIGN PATENT DOCUMENTS

| | | |
|---|---|---|
| DE | 10 2008 013 538 A1 | 10/2009 |
| GB | 1 519 545 A | 8/1978 |

\* cited by examiner

METHOD FOR SECURING AN ELECTRONIC DEVICE HAVING A SIGNAL OUTPUT AGAINST REMOVAL FROM A CARRYING DEVICE, AND CARRYING DEVICE

CROSS REFERENCE TO PRIOR APPLICATIONS

This application is a U.S. National Phase application under 35 U.S.C. §371 of International Application No. PCT/EP2013/067305, filed on Aug. 20, 2013 and which claims benefit to German Patent Application No. 10 2012 107 653.7, filed on Aug. 21, 2012. The International Application was published in German on Feb. 27, 2014 as WO 2014/029768 A1 under PCT Article 21(2).

FIELD

The present invention relates to a method for securing an electronic device, in particular a portable computer, in particular a tablet PC or a smartphone, having a signal output, for example, an audio output, and having an input apparatus, against removal from a carrying device, in particular from a presentation apparatus. The present invention also relates to a carrying device suitable for using said method.

BACKGROUND

At places frequently visited by the public which are at least partially unattended such as, for example, public buildings or stores such as, in particular, supermarkets, the electronic devices operated or there presented for sales must be secured against theft.

For this purpose, it is common to fixedly attach one end of a flexible securing element, for example, in the form of a cord or a cable, to the respective electronic device in a nonpositive or positive locking manner, and to fixedly connect the other end of the securing element to a fixture that cannot be transported, at least not without being detected, such as a carrying apparatus or a presentation apparatus, or to a wall, the floor, or the like.

The disadvantage here is that flexible cord elements disturb the visual impression. If the flexible cord elements are laid carelessly, there is also the danger that persons can get entangled therein and get injured, or pull and carry away the electronic device so that it is damaged or destroyed by it falling onto the floor.

SUMMARY

An aspect of the present invention is to provide a method for securing an electronic device, in particular a portable computer, in particular a tablet PC or a smartphone having a signal output, for example an audio output, and having an input apparatus, against removal from a carrying device, in particular from a presentation apparatus.

In an embodiment, the present invention provides a method for securing an electronic device comprising a signal output and an input apparatus against removal from a carrying device. The method includes inputting a code with the input apparatus, generating, with the code inputted with the input apparatus, via a data processing program, a signal at the signal output of the electronic device, providing a locking apparatus configured to secure the electronic device, comparing, with the locking apparatus, the signal with a predetermined target signal, and putting the locking apparatus into an unlocked state if a match exists between the signal and the predetermined target signal.

BRIEF DESCRIPTION OF THE DRAWINGS

The present invention is described in greater detail below on the basis of embodiments and of the drawings in which.

DETAILED DESCRIPTION

Figure 1:
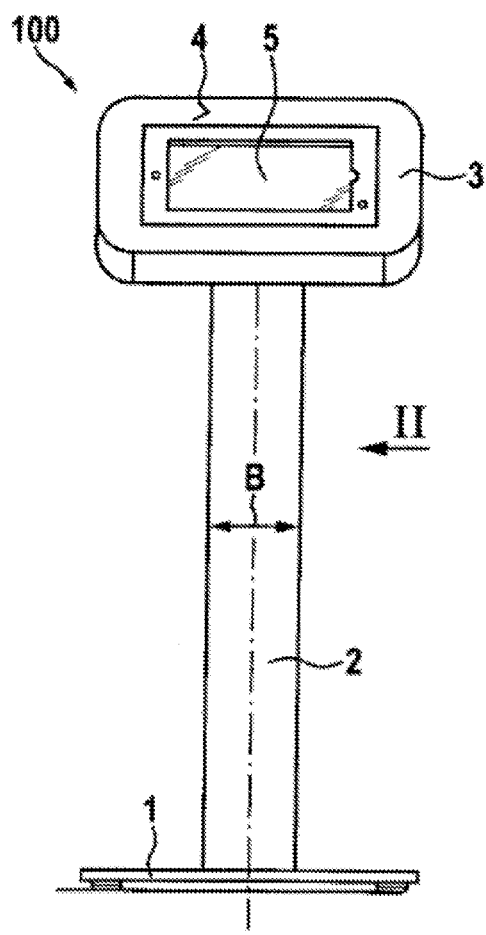
FIG. 1 shows the presentation in a front view (view I in FIG. 2)

The present invention provides that by means of a data processing program that can, for example, have been installed in advance in the electronic device, a code input via the input apparatus generates a certain signal, for example, a certain tone or a certain tone sequence, at a signal output, for example, at an audio output of the electronic device. A locking apparatus securing this electronic device is then acted on by this signal, for example, the tone or the tone sequence. The locking apparatus then compares this signal, for example, the tone or the tone sequence, with a predetermined target signal, for example, a predetermined target tone or a predetermined target tone sequence, in order to put the locking apparatus in its unlocked state if there is a match.

It is basically also possible to further improve the method so that, conversely, the locking state can also be effected by means of a code. The locking can, for example, be carried out in a simple manner purely mechanically without knowledge of the code so that personnel having no access to the code can equip empty and already open carrying devices with the respective electronic device provided for the carrying device.

Any type of signal that can be generated code-dependently in the respective electronic device at a signal output suitable for this purpose is suitable for the method, provided that the locking apparatus is suitable for detecting and evaluating the signal. Examples of conceivable signal types are Bluetooth, WiFi, or any other type of digital signals that are possible in different cases depending on the manufacturer (and possibly model) of the electronic device (e.g., tablet computer).

In an embodiment of the present invention, a code-dependent tone sequence with dual-tone frequencies can, for example, be generated with the aid of the data processing program since such a tone sequence can be compared by the locking apparatus with target tone frequencies in a particularly fail-safe manner, provided that the electronic device has an audio output.

In an embodiment, the present invention provides a carrying device, in particular a presentation device, which is improved with respect to securing an electronic device.

In an embodiment, the present invention provides a carrying device, in particular a presentation device, for an electronic device, in particular for a portable computer, in particular a tablet PC, or for a smartphone, having a signal output, for example, an audio output, and having an input apparatus, characterized in that the carrying device comprises a locking apparatus having a signal input, for example, an audio input, to which the signal output, for example, the audio output of the electronic device, can be connected, the locking apparatus being configured so that, in the case of a match of the signal, for example, the tone or the signal sequence, with a target tone or a target tone sequence, the locking apparatus is put into its unlocked state.

The carrying device according to the present invention, which is suitable for carrying out the securing method, can in particular be a presentation device for an electronic device that has a signal output, for example, an audio output, and has an input apparatus. Examples include tablet PCs or smartphones which have input apparatuses provided via the touch-sensitive display ("touchscreen") as well as a signal output, for example, an audio output, because they can, for example, also be used regularly for listening to music via headphones or downstream amplifiers.

In an embodiment of the present invention, the carrying device comprises a locking apparatus having a signal input, for example, an audio input, to which the signal output, for example, the audio output, of the electronic device can be connected.

The locking device is furthermore configured so that, in the case of a match of the signal, for example, the tone or tone sequence, with a predetermined target signal, for example, a target tone or a target tone sequence, the locking apparatus is put into its unlocked state.

"Apps" can be installed on the tablet PCs or smartphones to generate the code-dependent signal, for example, the tone or the tone sequence, which apps then determine the dependency of the signal from the code sequence, and through which programming of the signal sequence, for example, the tone sequence, and thus of the code at which the locking apparatus is to be put into its unlocked state, can, for example, be programmed.

Since the locking apparatus is configured so that in the case of a match of the signal, for example, the tone or the tone sequence, with a predetermined target signal, for example, a target tone or a target tone sequence, the locking apparatus is put into its unlocked state, unlocking can take place in that the pre-programmed code is input again via the input apparatus of the electronic device locked in the carrying device.

The carrying device according to the present invention can, for example, comprise a receiving apparatus for the electronic device, for example, a tray or a receiving slot with a safety flap, into which the electronic device can be inserted and from which it can be removed in the unlocked state, but in which the electronic device is secured against removal in the locked state. If the receiving apparatus is a tray, the carrying device and the tray can be designed so that, in the unlocked state, the tray protrudes at least partially out of the housing of the carrying device so that the electronic device can be inserted into the tray or can be removed therefrom, and that in the locked state, the tray can be placed back at least partially into the housing of the carrying device so that the electronic can no longer be removed because, for example, the opening that serves for inserting and removing the electronic device is at least partially closed.

In an embodiment of the carrying device according to the present invention, the tray can, for example, have an opening on a narrow side for inserting and removing the electrical device. The tray can, for example, be dimensioned so that the remaining narrow sides surround the electronic device at least substantially without play. On the side facing towards the viewer, a cover can, for example, be connected to the narrow sides, which cover has a cut-out which, for example, at least does not cover the input apparatus, and which does not, for example, cover any potentially existing control elements. In the unlocked state, the electronic device can then be inserted into the opening and can be pulled out again from said opening.

In an above-described design of the tray, the tray can, for example, be hingedly connected to the housing on the side opposite the opening. The locking apparatus is designed in this case so that, in the locking position, the locking apparatus locks the tray in the position in which it is at least partially moved back in that the locking apparatus comprises a fitting that can be moved by a motor, which fitting engages in the locking position behind a locking surface of the tray when the tray is in the position that is at least partially moved back into the housing of the carrying device. In the unlocking position in which the locking surface is released by the fitting, the tray can then be moved back into the position in which the electronic device can be moved out of the opening which is now accessible.

Handling of the carrying device according to the present invention is simplified if the tray, for example, comprises a reset apparatus which, in the unlocked state, automatically moves the tray into its position in which the tray protrudes out of the housing.

Any apparatus suitable for initiating the movement of the tray from the locked into the unlocked state can be provided as a reset apparatus. The reset apparatus can, for example, comprise a gas spring arrangement which can, for example, be cushioned, since comparatively low manufacturing efforts are involved. The gas spring arrangement is hinged at one end to the tray and to the housing at the other end so that, after releasing the locking surface by the fitting, the tray is pivoted by the fitting about the hinge axis defined by the hinged mounting and pivoted out of the housing.

In an embodiment, a carrying device according to the present invention is provided in which the tray forms a frame on the side that faces towards the viewer, which frame at least partially engages over the edge region of the electronic device that faces towards the viewer, and where, in the locked state, the upper side of the tray facing towards the viewer can, for example, be approximately flush with a housing surface that faces towards the viewer. Due to this measure, the carrying device according to the present invention exhibits a particularly flat and harmonious visual appearance which is particularly suitable for presenting high-quality electronic devices which likewise have a flat shape. It is also possible to visually adapt the housing to the electronic device, for example, so that it imitates the visual appearance of the presented electronic device so that the informed consumer recognizes from a distance which electronic device is presented.

The present invention is below further explained with reference to the attached drawings in which, partly schematically and partly in detailed cut-outs, three exemplary embodiments of the carrying device according to the present invention are illustrated using the example of a presentation device for a tablet PC.

The presentation device in FIG. 1 designated as a whole by 100 comprises a base 1 from which a support 2 extends approximately vertically upwards. In the direction of depth, i.e., in the direction of view I, the support 2 is formed to be flat. The thickness D of the support is approximately a fourth of its width B.

Figure 2:
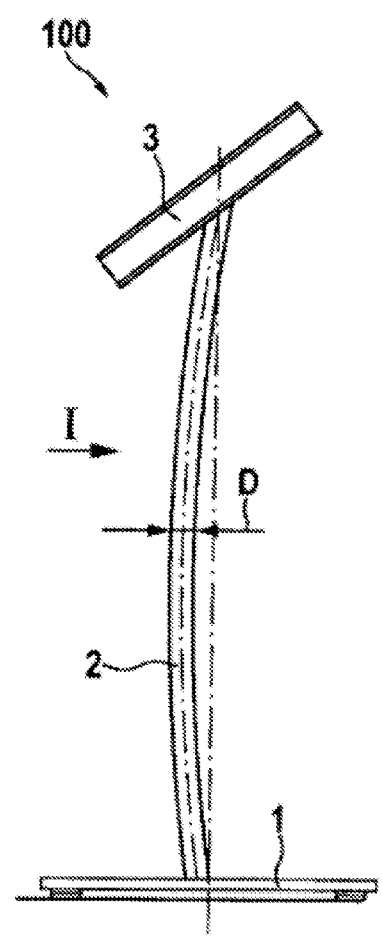
FIG. 2 shows the presentation device in a side view (view II in FIG. 1)

As can be seen in FIG. 2, the support 2 is convexly bent towards the front side illustrated in FIG. 1.

A housing 3 is fixedly mounted at the upper end of the support. The housing 3 is arranged inclined by approximately 45° with respect to the horizontal at such a height above the floor that an electronic device 5 located with its input apparatus, for example, a touchscreen, approximately in a plane formed by the upper side 4 of the housing 3 can be comfortably operated by a standing person.

The electronic device illustrated in the exemplary embodiment is a tablet PC.

Figure 3:
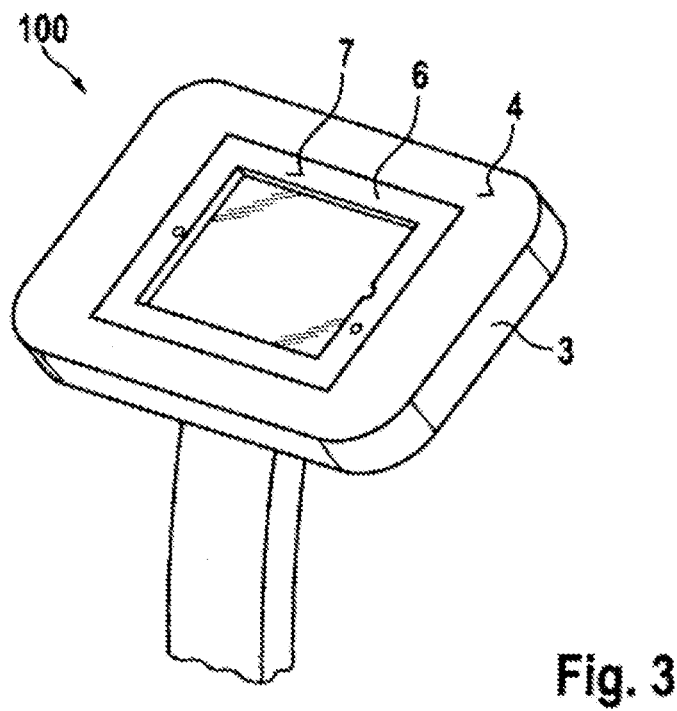
FIG. 3 shows a perspective view of the upper region of the presentation device with the tablet PC inserted and in the locked state, i.e., with a closed tray.
Figure 4:
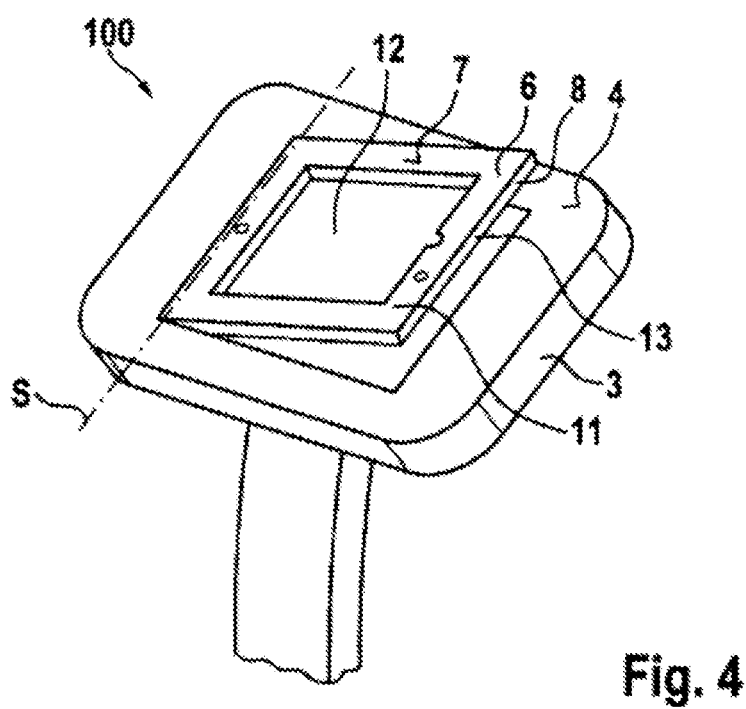
FIG. 4 shows the same view as in FIG. 3, but in the unlocked state, i.e., with the tray open, and without a tablet PC.

In the exemplary embodiment shown first, the housing 3 comprises a tray 6 which can be moved between a locked state, illustrated in FIG. 3, in which its upper side 7 is approximately aligned with the upper side 4, and an unlocked state, illustrated in FIG. 4, in which the tray 6 is pivoted about a hinge axis S, which runs parallel to the left narrow side, so that the narrow side 8 opposite the hinge axis S protrudes out of the housing 3.

Figure 5:
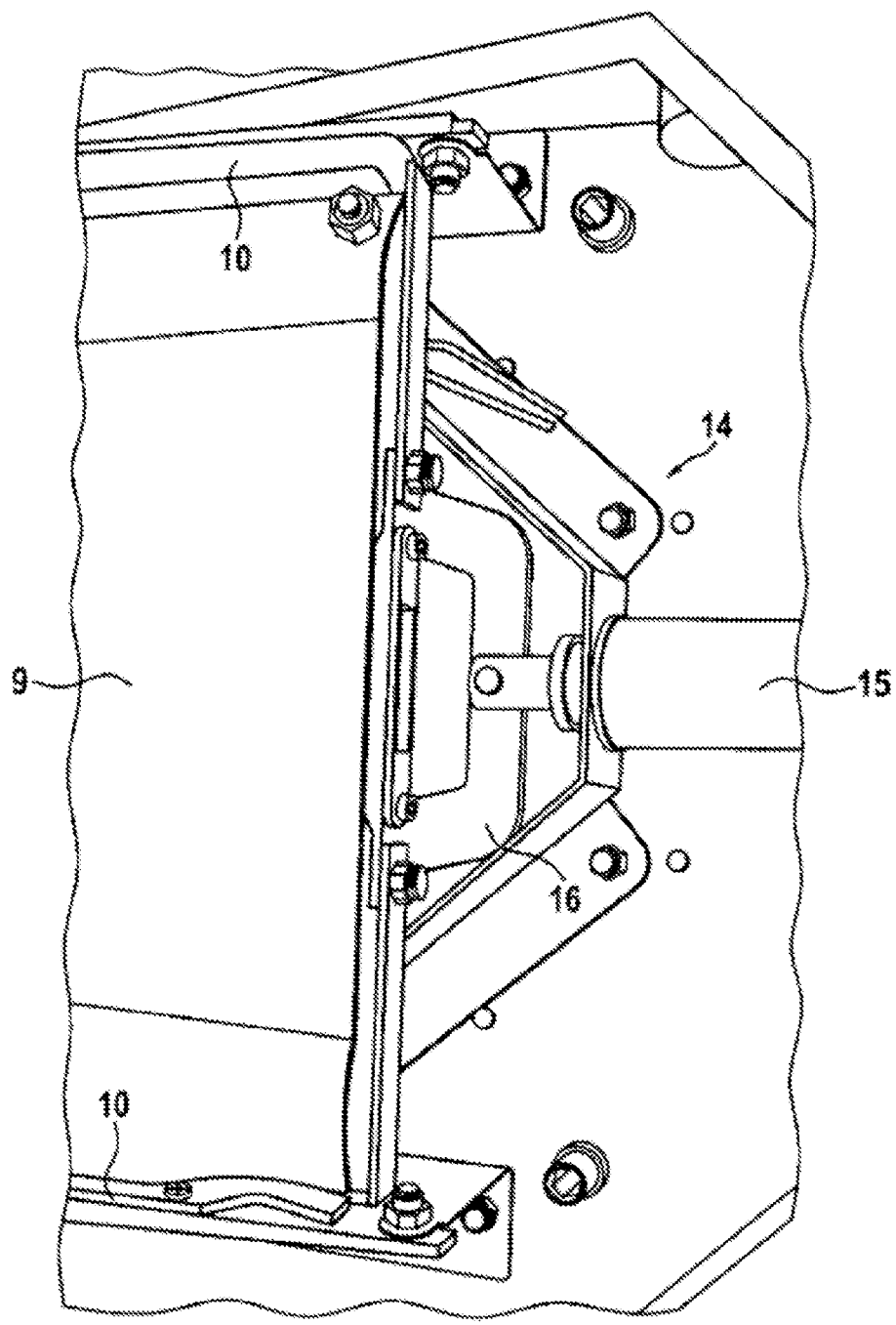
FIG. 5 shows a partial view into the interior of the housing of the presentation device in the region around the right edge of the tray (the cover of the housing and the tray, which form the upper side of the housing, is removed)

As is shown in particular in FIG. 5, the tray 6 has a closed bottom 9. Vertical walls 10, to which a cover 11 of the tray is connected, extend upwards from the bottom 9, except on the narrow side 8. The upper side of the cover 11, which is not mounted in FIG. 5, forms the visual side of the tray 6. The cover includes a cut-out 12, the position and dimension of which is adapted to the electronic device to be presented. The cut-out 12 for a tablet PC is selected, for example, so that the touchscreen and, moreover, components possibly provided at the front side, such as switches or camera lenses, are not covered by the cover 11.

The walls 10 are dimensioned so that the sides of the bottom 9 and the cover 11 which face one another are at a distance from one another so as to permit inserting of the electronic device to be presented through an opening 13 formed on the narrow side 8 without any problems when the tray 6 is in its unlocked state, as illustrated in FIG. 4.

In this unlocked state, the tray 6 is held by a gas spring which acts between the tray and the housing and which is not illustrated in the drawings. By manually applying pressure on the upper side 7, the tray 6, by overcoming the reset force exerted by the gas spring, can be transferred into the locked state illustrated in FIG. 3, in which the upper side 7 of the cover 11 is at least substantially aligned with the upper side 4 of the housing.

A locking apparatus 14, which is not shown as a whole in the drawings, is provided in the housing 3. The locking apparatus 14 comprises a fitting 16 that can be displaced by means of a linear motor 15. The fitting 16 is operatively connected to locking hooks 17 so that the locking hooks 17 can be moved from a position, in which they engage behind a locking surface 18 provided on the tray 6 to hold the tray 6 in its locking position, and a position, in which they release the locking surface 18.

Spiral springs 19 serve to reset the locking hooks 17 into the locking position.

Figure 6:
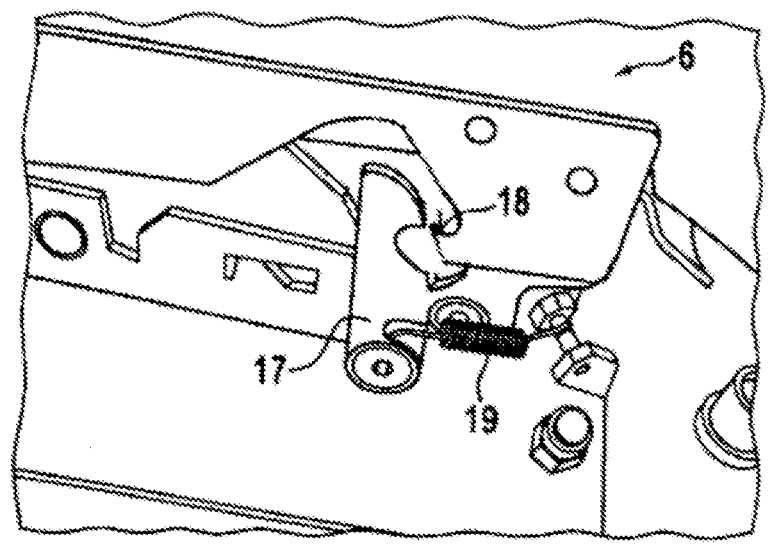
FIG. 6 shows a perspective detailed view of the locking apparatus in the locked state.
Figure 7:
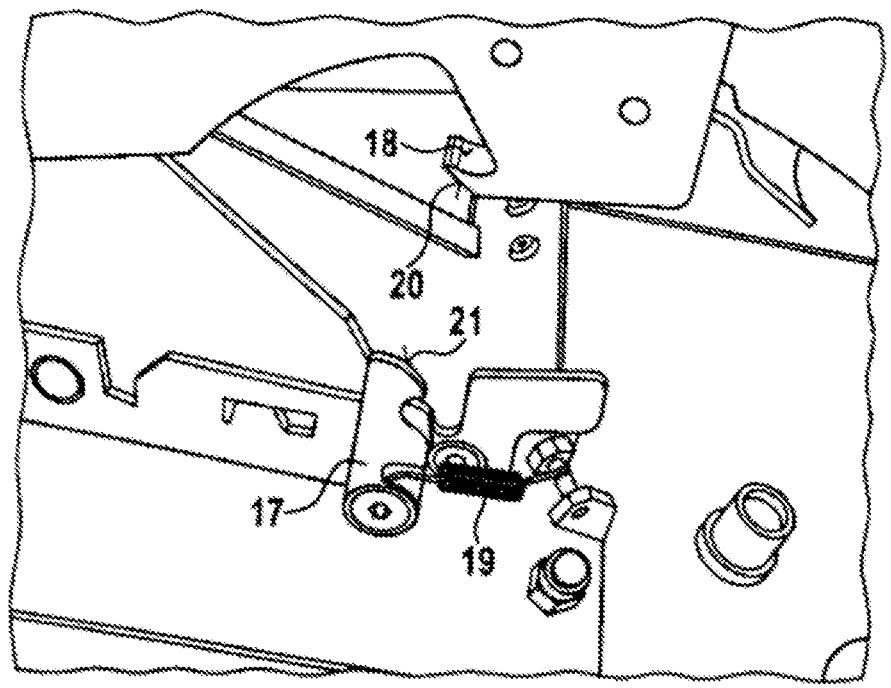
FIG. 7 shows the same view of the locking apparatus as in FIG. 6, but in the unlocked state.

If above always plural is used in connection with the looking hooks 17, this due to the fact that a locking hook 17, a locking surface 18 and a spiral spring 19 are provided on each of the two narrow sides 10 near the narrow side 8. FIGS. 6 and 7 show in each case only one locking hook 17 with an associated locking surface 18 and spiral spring 19.

The operating mode of the locking apparatus is hereafter explained in greater detail. In order to transfer the tray from its locked state illustrated in FIG. 3 into its unlocked state illustrated in FIG. 4, the linear motor 15 is first activated so that the fitting 16 is moved into a position in which the fitting 16 pivots the locking hooks 17 against the spring force exerted by the spiral springs 19 so that the locking hooks 17 release the locking surfaces 18. This state is illustrated in FIG. 6. The gas spring, which is not visible in the drawing, causes the tray 6 to pivot about the hinge axis S by an angle of, for example, 30°, as illustrated in FIGS. 4 and 7. The fitting 16 is subsequently moved back into its initial position by means of the linear motor 15 so that the locking hooks 17, supported by the spiral springs 19, move back into their initial position illustrated in FIG. 7. If the tray 6 is now again manually pushed downwards, the inclined surface 20 adjoining the locking surface 18 slides on the inclined surface 21 of the locking hook and thereby continues to push the respective locking hook 17 while overcoming the spring force exerted by the spiral spring 19 until the spring force effects that the locking hook can lock in place again in the locking surface 18.

Figure 8:
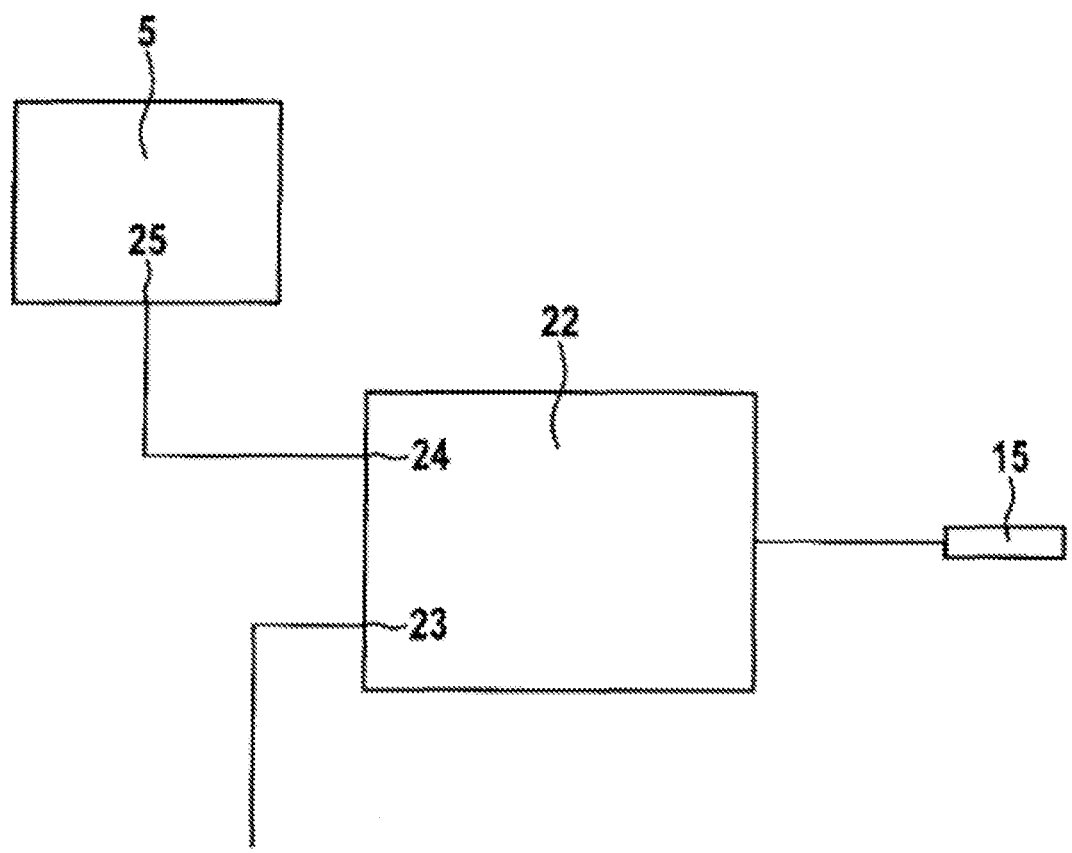
FIG. 8 shows a block diagram of the presentation device.

In order to supply the linear motor 15 with the required driving power for carrying out the unlocking process, the linear motor 15 is connected to a control unit 22 of the locking apparatus 14, which control unit 22 is illustrated purely schematically in FIG. 8. The control unit 22 has a connector 23 for connecting to an external voltage source, and has an audio input 24. The audio input 24 is connected to an audio output 25 of the electronic device 5. For this purpose, a fixedly installed contact device, which is not illustrated, can be provided in the tray 6, which contact device automatically establishes the contact between the audio output 25 and the audio input 24 when the electronic device 5 is inserted into the tray 6. It is also possible, however, to simply provide a cable that is permanently connected to the audio input 24 and is equipped with a jack plug which is manually plugged into the usually available audio outlet socket of the electronic device 5.

For actuating the control unit 22, the electronic device is provided with software which causes a dual tone sequence at the audio outlet 25 which is recognized by the control unit 22 as a signal for unlocking the tray and therefore for correspondingly actuating the linear motor 15 only if a certain code is input via the input apparatus, for example, a touchscreen, of the electronic device.

Figure 9:
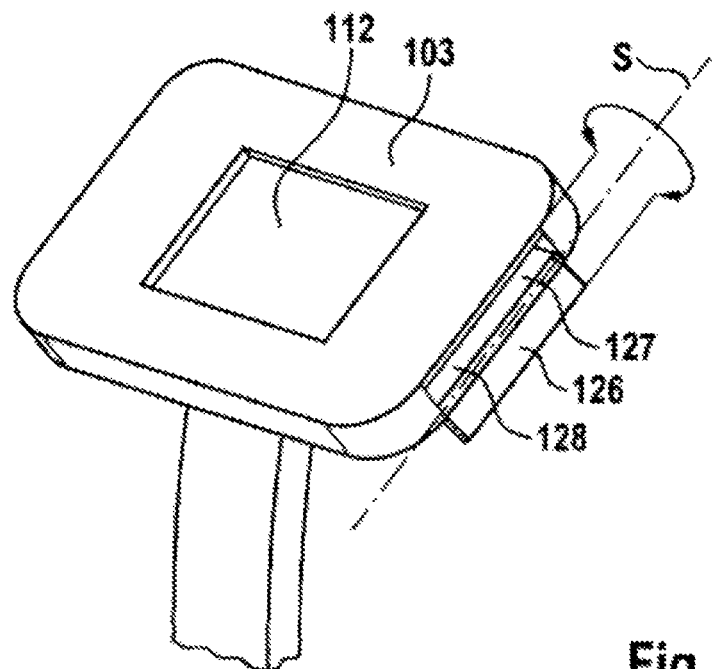
FIG. 9 shows a perspective view of the upper region of an exemplary embodiment of the presentation apparatus in the unlocked state, i.e., with the safety flap open and without tablet PC.

FIG. 9 shows a second exemplary embodiment. This exemplary embodiment differs from the first exemplary embodiment only by the fact that instead of a tray, a receiving slot 127 is provided for the electronic device, which receiving slot 127 can be closed by means of a safety flap 126. The housing 103 thus comprises a safety flap 126 that can be moved between a locked state, which is not shown in the drawings, and an unlocked state, shown in FIG. 9, in which the safety flap 126 is pivoted about a hinge axis S, which runs parallel to the wide side of the safety flap, so that it opens an opening 128. In accordance with the preceding exemplary embodiment, a window or cut-out 112 can be provided.

Figure 10:
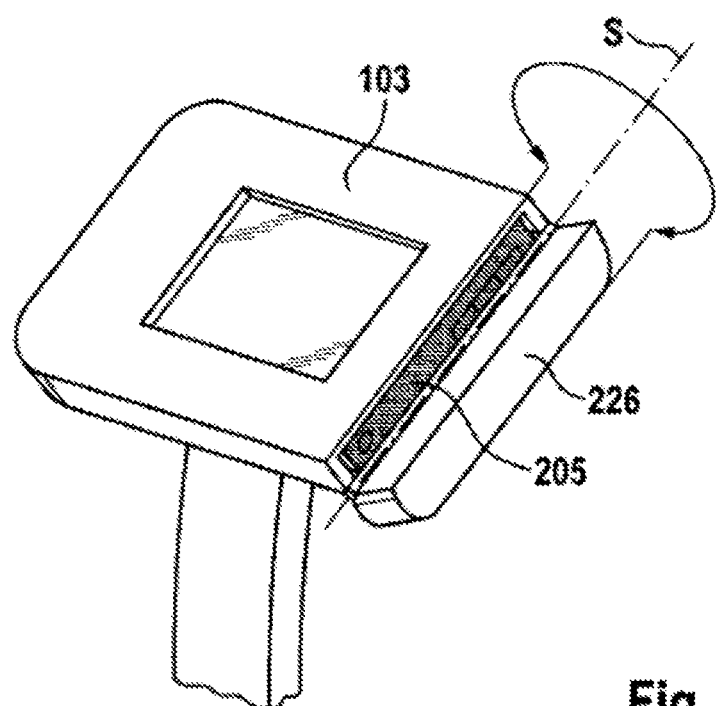
FIG. 10 shows a perspective view of the upper region of an exemplary embodiment of the presentation device in the unlocked state, i.e., with the safety flap open and with the tablet PC.

FIG. 10 shows a third exemplary embodiment which differs from the exemplary embodiment shown in FIG. 9 only by the fact that the safety flap 226 is formed as a voluminous cover. The electronic device 205 can be inserted and removed in a simple manner.

The present invention is not limited to embodiments described herein; reference should be had to the appended claims.

LIST OF REFERENCE NUMERALS 100 presentation device
1 base
2 support
3, 103 housing
4 upper side
5, 205 electronic device
6 tray
7 upper side
8 narrow side
9 bottom
10 walls
11 cover
12, 112 cut-out
13 opening
14 locking apparatus
15 linear motor
16 fitting
17 locking hook
18 locking surface
19 spiral springs
20 inclined surface
21 inclined surface
22 control unit
23 connector
24 audio input
25 audio output
126, 226 safety flap
127 receiving slot
128 opening
B width
D thickness
S hinge axis

What is claimed is:

1. A carrying device for an electronic device comprising a signal output which is configured to provide a signal, the carrying device comprising:
   a locking apparatus comprising a signal input configured to be connectable to the signal output of the electronic device, the locking apparatus being configured to be put into an unlocked state if the signal matches a target signal;
   a receiving apparatus for the electronic device, the receiving apparatus being configured, in the unlocked state, to have the electronic device be inserted therein and to have the electronic device be removed therefrom, the receiving apparatus being provided as a tray comprising a narrow side having an opening, the opening being configured to have the electronic device be inserted therein and to be removed therefrom; and
   a housing,
   wherein,
   in the unlocked state, the tray is configured to protrude out of the housing so that the opening is open and, in a locked state, the tray is at least partially sunk into the housing so that the opening is at least partially inaccessible, and
   on a side opposite the opening, the tray is hingedly connected to the housing of the carrying device so as to be pivotable about a hinge axis.

2. The carrying device as recited in claim 1, wherein, the signal is a tone or a one sequence.

3. The carrying device as recited in claim 1, wherein the target signal is a target tone or a target tone sequence.

4. The carrying device as recited in claim 1, wherein the receiving apparatus is a tray or a receiving slot comprising a safety flap.

5. The carrying device as recited in claim 1, wherein the carrying device is a presentation device.

6. The carrying device as recited in claim 1, wherein the electronic device is a portable computer, a tablet PC, or a smartphone.

7. The carrying device as recited in claim 1, wherein the signal output is an audio output.

8. The carrying device as recited in claim 1, wherein, the locking apparatus further comprises a fitting configured to be moved by a motor,
   the tray further comprises a locking surface, and
   in a locking position, the fitting is configured to engage behind the locking surface of the tray when the tray is in a position that is at least partially moved back into the housing of the carrying device.

9. The carrying device as recited in claim 1, wherein, the tray further comprises a reset apparatus which is configured, in the unlocked state, to move the tray into a position in which the tray protrudes out of the housing.

10. The carrying device as recited in claim 9, wherein the reset apparatus comprises a gas spring arrangement.

11. The carrying device as recited in claim 1, wherein on a side of the carrying device facing towards a viewer, the tray further comprises a tray cover comprising a tray cut-out and a tray upper side,
   the tray cover is configured to at least partially engage over an edge region of the electronic device facing towards the viewer.

12. The carrying device as recited in claim 11, wherein, the housing further comprises a housing upper side, and the tray upper side is approximately flush with the housing upper side when facing towards the viewer.

* * * * *